United States Patent [19]

Sackmann et al.

[11] Patent Number: 5,567,779
[45] Date of Patent: Oct. 22, 1996

[54] SUPER-ABSORBENT POLYMERS

[75] Inventors: Gunter Sackmann; Rolf-Volker Meyer, both of Leverkusen; Siegfried Korte, Odenthal; Sergej Schapowalow, Leverkusen, all of Germany

[73] Assignee: Bayer Aktiengesellschaft, Leverkusen

[21] Appl. No.: 546,446

[22] Filed: Oct. 20, 1995

Related U.S. Application Data

[62] Division of Ser. No. 391,506, Feb. 21, 1995, Pat. No. 5,496,890.

[30] Foreign Application Priority Data

Mar. 3, 1994 [DE] Germany ............... 44 06 951.0

[51] Int. Cl.$^6$ ........................................... C08F 8/12
[52] U.S. Cl. ..................... 525/329.1; 525/329.2; 525/329.3; 525/362; 525/368; 525/369
[58] Field of Search .................. 525/367, 368, 525/369, 329.1, 329.2, 329.3

[56] References Cited

U.S. PATENT DOCUMENTS

| | | | |
|---|---|---|---|
| 3,897,382 | 7/1975 | Stoy et al. | 525/329.1 |
| 3,929,740 | 12/1975 | Engelhardt et al. | |
| 4,228,056 | 10/1980 | Stoy. | |
| 4,357,437 | 11/1982 | Huhn et al. | |
| 4,795,762 | 1/1989 | Diamantoglou et al. | |
| 4,943,618 | 7/1990 | Stoy et al. | 525/329.1 |
| 5,252,692 | 10/1993 | Lory et al. | 528/329.1 |

FOREIGN PATENT DOCUMENTS

| | | |
|---|---|---|
| 2028956 | 12/1970 | European Pat. Off. |
| 0047381 | 3/1982 | European Pat. Off. |
| 0170081 | 2/1986 | European Pat. Off. |
| 0241885 | 10/1987 | European Pat. Off. |
| 2337505 | 2/1975 | Germany. |
| 1104567 | 2/1968 | United Kingdom. |

*Primary Examiner*—Bernard Lipman
*Attorney, Agent, or Firm*—Connolly & Hutz

[57] ABSTRACT

A process for the production of super-absorbent polymers with a swelling capacity in water-containing liquids of up to 1,000 g/g in which aqueous emulsions of particularly high molecular weight polymers of acrylonitrile are partly hydrolyzed by reaction with aqueous solutions of alkali metal and/or alkaline earth metal hydroxides, the polymers are precipitated in powder form by addition of water-miscible organic solvents, separated off, dried and then optionally heated for a short time. The super-absorbent polymers are used as water-storing materials, for example in sanitary articles, in agriculture or in the sheathing of electrical cables.

11 Claims, No Drawings

SUPER-ABSORBENT POLYMERS

This is a divisional application of Ser. No. 391,506, filed Feb. 21, 1995, which issued to U.S. Pat. No. 5,496,890 on Mar. 5, 1996.

This invention relates to the production of super-absorbent powder-form polymers with an extremely high swelling capacity.

Super-absorbent polymers are known and are mainly used in the production of diapers and incontinence articles, but also as water-storing materials in agriculture and in the sheathing of electrical cables. In general, these super-absorbent polymers are wide-mesh crosslinked, water-insoluble polymers based on alkali metal salts of polyacrylic acid or copolymers of alkali metal salts of acrylic acid and acrylamide which are obtained by radical-initiated copolymerization of acrylic acid and polyfunctional monomers, such as divinylbenzene, ethylene glycol dimethacrylate, ethylene glycol diallylether, butanediol acrylate, hexanediol methacrylate, polyglycol diacrylate, trimethylol propane diacrylate, allyl acrylate, diallyl acrylamide, triallylamine, diallylether, methylene bis-acrylamide and N-methylol acrylamide. By virtue of their structure, polymers of this type are capable of absorbing large quantities of liquids, swelling and forming hydrogels in the process, and of retaining them, even under pressure.

There are also super-absorbent polymers based on hydrolyzates of graft copolymers of acrylonitrile on starch and on crosslinked starch/acrylic acid graft copolymers in which the carboxyl groups are partly neutralized.

The acidic or alkaline hydrolysis of polyacrylonitrile also leads to polymers containing carboxyl or carboxylate groups. These are generally water-soluble (and hence non-swellable) because the polyacrylonitrile used as starting material, which is obtained by precipitation polymerization, has an excessively low molecular weight.

According to the invention, super-absorbent polymers with an extremely high swelling capacity can be produced from uncrosslinked, aqueous acrylonitrile polymer emulsions.

Accordingly, the present invention relates to a process for the production of super-absorbent polymers with a swelling capacity of up to 1,000 g/g in water-containing liquids and up to 90 g/g in electrolyte solutions, in which aqueous emulsions of particularly high molecular weight homopolymers and/or copolymers of acrylonitrile are partly hydrolyzed by reaction with aqueous solutions of alkali metal hydroxides, the polymers are precipitated in powder form by addition of water-miscible organic solvents, separated off, dried and then optionally heated for a short time.

Highly concentrated aqueous emulsions of homopolymers and copolymers of acrylonitrile with mean particle diameters of 100 to 300 nm can be produced using special anionic polymeric emulsifiers (cf. German patent application P 42 33 026.2). The molecular weights of the polymers obtained by this special emulsion polymerization process are in the range from $5 \cdot 10^5$ to $1 \cdot 10^7$ g/mole and preferably in the range from $2 \cdot 10^6$ to $5 \cdot 10^6$ g/mole. If these aqueous acrylonitrile polymer emulsions are treated with aqueous solutions of alkali metal hydroxides, a conversion of nitrile groups into carboxylate and carbonamide groups takes place in a short time at 50° to 100° C. and preferably at 70° to 95° C. Insoluble, but highly water-swellable powders with extremely favorable super-absorbent properties are obtained by suitably controlling the reaction. The insolubility of these products in water, which is crucially important to their swelling capacity, is achieved by a balanced ratio of carboxylate and carbonamide groups on the one hand to unreacted nitrile groups on the other hand.

The production of the aqueous emulsions of high molecular weight homopolymers or copolymers of acrylonitrile required as starting products is described, for example, in German patent application P 42 33 026.2. The starting materials for producing the super-absorbent polymers according to the invention can be obtained by this process which is carried out in the presence of a polymeric anionic emulsifier and leads to fine-particle (mean particle diameter 100 to 300 nm, as determined by laser correlation spectroscopy) polymer emulsions with very high molecular weights. Their average molecular weights (weight averages as determined by gel permeation chromatography) are in the range from $5 \cdot 10^5$ g/mole to $1 \cdot 10^7$ g/mole and preferably in the range from $2 \cdot 10^6$ g/mole to $5 \cdot 10^6$ g/mole.

The polymer dispersions obtained by this process, for example, may be directly reacted with the alkali metal hydroxides. By virtue of the large surface of the polymer particles, very short reaction times are possible.

The molecular weights of the end products are higher than those of the starting products because the molecular weight increases as a result of hydrolysis:

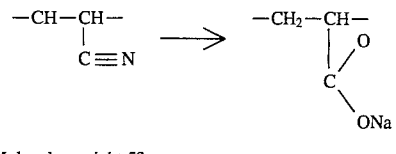

Molecular weight 53         Molecular weight 94

Aqueous, preferably 0.5 to 10% by weight solutions of alkali metal hydroxides, for example NaOH or KOH, may be used for the reaction (hydrolysis). The molar ratio of nitrile groups of the starting polymers to the hydroxyl groups of the alkali metal hydroxides is preferably from 1:0.9 to 1:0.1 and more preferably from 1:0.7 to 1:0.3. Products with particularly favorable performance properties are obtained when this ratio is from 1:0.5 to 1:0.4. The hydrolysis is generally carried out at 50 to 100° C. and preferably at 70° to 95° C. The degree of neutralization of the carboxyl groups formed in the hydrolysis reaction can be varied by addition of corresponding quantities of mineral acids, such as HCl for example. Thus, generally between 30 and 100% and preferably between 50 and 70% of the carboxyl groups in the end product are neutralized, the remaining carboxyl groups being present in the acid form.

The necessary reaction time depends upon the reaction temperature and the required degree of hydrolysis (this is of course also a function of the reaction temperature). In general, 20 to 90 mole-% of the acrylonitrile units in the acrylonitrile homopolymers or copolymers are converted into carboxylate or carbonamide groups. The properties of the super-absorbent polymers can be influenced through the degree of hydrolysis. The degree of swelling which can be achieved increases with the content of carboxyl groups. At the same time, the water-soluble component of the super-absorbent polymers also increases, which is a disadvantage in certain applications. Accordingly, the reaction temperature, the reaction time and the molar ratio of nitrile groups to carboxyl groups have to be empirically adjusted in each individual case in such a way that products having the most favorable properties for a given application are obtained.

To isolate the super-absorbent polymers in powder form, water-miscible solvents, such as acetone or ethanol, are added with vigorous stirring on completion of hydrolysis in a quantity which may be up to 3 times the volume of the aqueous reaction mixture. Ethanol is preferably used in a ratio by volume of 1:1. The super-absorbent polymers precipitate in the form of a fine-particle, easy-to-filter powder. After drying at 50° to 100° C., they may be graded according to particle size by sieving. The particle sizes (mean diameters) are in the range from 50 to 3,000 μm. The properties of the super-absorbent polymers, for example their swelling index, are also dependent on their particle size. The smaller the particles, the more quickly the equilibrium swelling degree is reached.

By subsequent heating for 2 to 30 minutes and preferably from 5 to 15 minutes to a temperature of 150° to 250° C. and preferably to a temperature of 170° to 210° C., the super-absorbent polymers can be distinctly further improved in their already excellent performance properties. This applies in particular to the swelling kinetics, i.e. the rate of absorption, and to the gel strength of the swollen polymers and also to their capacity to absorb water-containing liquids under pressure.

The swelling capacity of the super-absorbent materials according to the invention is up to 1,000 g/g in pure water and up to 90 g/g in physiological sodium chloride solution (0.9%).

The present invention also relates to super-absorbent polymers based on partly hydrolyzed high molecular weight linear homopolymers and/or copolymers of acrylonitrile in which 30 to 60 mole-% of the nitrile groups are converted into carboxylate groups and 20 to 60 mole-% of the nitrile groups into carbonamide groups and 10 to 20 mole-% of the nitrile groups remain unchanged, the uncrosslinked polymers having a swelling capacity of up to 1,000 g/g in water and up to 90 g/g in physiological sodium chloride solution.

Super-absorbent polymers in which 40 to 50 mole-% of the nitrile groups are converted into carboxylate groups and 40 to 50 mole-% of the nitrile groups into carbonamide groups, 10 to 20 mole-% remaining unchanged, are preferred.

EXAMPLES

Example 1

Preparation of a high molecular weight polyacrylonitrile emulsion 48.8 g of a 20.5% by weight aqueous solution of an anionic polymeric emulsifier containing sulfonic acid groups based on an alternating copolymer of maleic anhydride and diisobutylene (for further particulars, see DE-OS 38 07 097, Example 2) and 484 g of deionized water are introduced into a 2-liter three-necked flask equipped with a stirrer, reflux condenser, nitrogen inlet pipe and three dropping funnels. The contents of the flask are then heated with stirring to 60° C. while nitrogen is passed over, after which solutions I to III are simultaneously added over a period of 3 hours:

| | |
|---|---|
| Solution I: | 200 g of acrylonitrile |
| Solution II: | 358 mg of hydrogen peroxide (35% aqueous solution) |
| | 100 g of deionized water |
| Solution III: | 203 mg of hydroxymethanesulfinic acid, Na salt |
| | 100 g of deionized water |

After the addition, the contents of the flask are stirred for 6 hours at 60° C. The residual monomers are then removed by vacuum distillation. A fine-particle emulsion with a solids content of 19% by weight is obtained after filtration through a 100 μm filter cloth.

Mean particle diameter: 150 nm (as determined by laser correlation spectroscopy)

Viscosity [$^3$] (as measured in dimethyl formamide at 25° C.): 8.86 dl/g

Production of the super-absorbent polymer 279 g of the polyacrylonitrile emulsion prepared in accordance with Example 1 and 200 g of a 10% by weight sodium hydroxide solution are added with stirring to a 2-liter four-necked flask equipped with a reflux condenser, thermometer, dropping funnel and stirrer. The reaction mixture is heated with stirring to 95° C. while nitrogen is passed over. During this heating phase, the color of the polymer changes from colorless via yellow to dark red, finally becoming colorless again. After a degree of hydrolysis of 43 to 47% (as determined by quantitative measurement of the ammonia escaping) has been reached, the reaction mixture obtained is cooled to 30° to 40° C. and the unused sodium hydroxide is neutralized by gradual addition of hydrochloric acid (over a period of 30 to 60 minutes).

The super-absorbent polymer is precipitated by addition of ethanol in portions with vigorous stirring at 25° to 30° C. The ratio by volume of ethanol to water is 1:1. Approximately 90 g of a colorless powder are obtained after filtration and drying in a vacuum drying cabinet at 60° C. After size-reduction in a mixer, the powder consists of particles between 200 and 3,000 μm in diameter. It can be graded by sieving.

Heat treatment of the super-absorbent polymer

The dried super-absorbent polymer is kept in a drying cabinet for about 15 minutes at 180° C.

Measurement of the degree of swelling

Approximately 200 mg of the super-absorbent polymer are weighed into a 300 ml glass beaker, 200 ml of distilled water or 30 ml of a 0.9% sodium chloride solution are poured over the polymer and the whole is left standing at 20° C. After the equilibrium swelling degree has been reached, the gel obtained is filtered through a 50 μm mesh filter cloth and weighed out. The degree of swelling is then calculated from the ratio of final weight to starting weight in g/g. Each individual determination is carried out three times. The measuring accuracy is ±5%.

Degree of swelling in water without thermal aftertreatment 950 g/g, after thermal aftertreatment 620 g/g.

Degree of swelling in 0.9% sodium chloride solution without thermal aftertreatment 65 g/g, after thermal aftertreatment 53 g/g.

Examples 2 to 7

The results of Examples 2 to 7 are set out in Table 1. The polyacrylonitrile emulsions prepared as described in Example 1 were used for Examples 2 to 5. Columns 3 to 5 of Table 1 indicate the limiting viscosity numbers of these polymers, the solids contents of the emulsions and the particle diameters.

Example 6 shows the results obtained with a commercially available polyacrylonitrile produced by precipitation polymerization with an [$^3$] value of 1.8 (dl/g) (Dralon T®, a product of Bayer AG), hydrolysis being carried out under the same conditions as in Examples 1 to 5. The results in columns 11 and 12 of Table 1 show that this polymer does not swell, but instead dissolves completely in distilled water or in 0.9% aqueous sodium chloride solution.

Example 7 of Table 1 uses a polyacrylonitrile obtained by precipitation polymerization with an [$^3$] value of 8.2 (dl/g) which was obtained as follows:

The following reaction mixture is introduced into a 10 liter stirred reactor:

| | |
|---|---|
| 6,000 g | deionized water |
| 30 g | Moviol 26-88 |
| 2,000 g | acrylonitrile |
| 12 g | azoisobutyrodinitrile |
| 6.65 g | t-butyl perpivalate (75%) |

The reaction mixture is first stirred for 20 minutes at 59° C. while nitrogen is passed over. The temperature is then reduced to 50° C., followed by stirring for another 120 minutes at that temperature. After stirring for another 50 minutes at 50° C., the polyacrylonitrile precipitated is isolated by decantation after cooling to room temperature, the precipitate is repeatedly stirred up with deionized water, filtered and dried to constant weight at 60° C. in a recirculating air drying cabinet.

Yield 1,382 g $[\eta]$ (in dimethyl formamide, T=25° C.): 8.2 dl/g

The degrees of swelling for this product after its conversion into a super-absorbent polymer according to Example 1 are shown in Table 1.

Examples 1 to 5 clearly show the excellent performance properties of the super-absorbent polymers obtained in accordance with the invention. If, by contrast, powder-form polyacrylonitrile is used as the starting material, either no super-absorbent polymers are obtained (Example 6) or the super-absorbent properties are significantly inferior (Example 7).

copolymers of acrylonitrile are partly hydrolyzed by reaction with aqueous solutions of alkali metal hydroxides, wherein, after the reaction, 10–20 mole-% of the nitrile groups remain unchanged, the polymers are precipitated in powder form by addition of water-miscible organic solvents, separated off, dried and then optionally heated for a short time.

2. A process as claimed in claim 1, in which the acrylonitrile polymer has an average molecular weight (weight average) of $5 \cdot 10^5$ to $1 \cdot 10^7$ g/mole.

3. A process as claimed in claim 1, in which the molar ratio of the nitrile groups of the polymers to the alkali metal hydroxides is 1:1 to 1:0.1.

4. A process as claimed in claim 1, in which the reaction is carried out at 50° to 100° C.

5. A process as claimed in claim 1, in which 20 to 90 mole-% of the nitrile groups of the acrylonitrile polymer are converted into carboxylate or amide groups.

6. A process as claimed in claim 1, in which water-miscible organic solvents are used to precipitate the powder.

7. A process as claimed in claim 1, in which the powders precipitated are heated for 2 to 30 minutes to 150° to 250° C.

8. A method of using the super-absorbent polymers produced by the process claimed in claim 1, wherein said polymers are placed in sanitary articles.

9. A method of using the super-absorbent polymers produced by the process claimed in claim 1, wherein said polymers are formed into water-storing materials for agriculture applications.

10. A method of using the super-absorbent polymers

TABLE 1

| | | | | Examples 2 to 7 | | | | | | |
|---|---|---|---|---|---|---|---|---|---|---|
| Ex. No. | Starting product | $[\eta]$ Value of PAN emulsion [dl/g] | S.C. of PAN emulsion (%) | P.S. of PAN emulsion | Hydrolysis temperature (°C.) | Hydrolysis time (h) | $[C_oNaOH]$ % by weight | Yield (g)** | Particle size (μm) | S* in $H_2O$ (g/g) | S* in 0.9% NaCl (g/g) |
| 2 | Emulsion | 6.74 | 23.3 | 242 nm | 95 | 3.0 | 3.62 | 89.5 | 20–300 | 85/ . . . | 58.9/ . . . |
| 3 | Emulsion | 7.83 | 24.2 | 288 nm | 95 | 1.5 | 4.15 | 89.8 | 20–3,000 | 1,000/650 | 72/57.4 |
| 4 | Emulsion | 7.0 | 25.4 | 100 nm | 95 | 1.5 | 4.15 | 90.5 | 20–3,000 | 950/ . . . | 70/ . . . |
| 5 | Emulsion | 8.2 | 25.6 | 219 nm | 95 | 1.5 | 4.15 | 90.0 | 20–3,000 | 1,050/670 | 70/58 |
| 6 | Dralon ® T | 1.8 | — | 20–60 μm | 95 | 3.0 | 4.15 | 87.0 | 20–3,000 | 0.0 | 0.0 |
| 7 | Powder | 8.2 | — | 50–100 μm | 95 | 5.0 | 3.02 | 86.0 | 20–3,000 | 643/ . . . | 54.5/ . . . |

*S: Degree of swelling; 1st value: before the heat treatment, 2nd value: after the heat treatment
**Yield in g based on 53 g of PAN, expressed as solids.

We claim:

1. A process for the production of super-absorbent polymers, characterised in that fine-particle aqueous emulsions of particularly high molecular weight homopolymers and/or produced by the process claimed in claim 1, wherein said polymers are placed in the sheathing of electrical cables.

11. A method of using the super-absorbent polymers as claimed in claim 8, wherein said sanitary articles are diapers.

* * * * *